(12) United States Patent
Shahin (10) Patent No.: US 10,995,807 B2
(45) Date of Patent: May 4, 2021

(54) BRAKE ASSEMBLY (71) Applicant: MANDO CORPORATION, Gyeonggi-do (KR)

(72) Inventor: Hatem Shahin, Pfaffenhofen (DE)

(73) Assignee: MANDO CORPORATION, Gyeonggi-Do (KR)

( * ) Notice: Subject to any disclaimer, the term of this patent is extended or adjusted under 35 U.S.C. 154(b) by 67 days.

(21) Appl. No.: 16/663,307

(22) Filed: Oct. 24, 2019

(65) Prior Publication Data

US 2020/0158196 A1 May 21, 2020

(30) Foreign Application Priority Data

Nov. 19, 2018 (DE) .......................... 102018219752.0

(51) Int. Cl.
*F16D 55/18* (2006.01)
*F16D 65/12* (2006.01)
(Continued)

(52) U.S. Cl.
CPC ............ *F16D 55/226* (2013.01); *B60T 1/065* (2013.01); *F16D 65/0056* (2013.01);
(Continued)

(58) Field of Classification Search
CPC .......... F16D 55/18; F16D 55/22; F16D 65/09; F16D 65/18; F16D 65/20
(Continued)

(56) References Cited

U.S. PATENT DOCUMENTS

4,775,033 A * 10/1988 Heibel ................ F16D 55/2262
188/73.43
5,014,827 A * 5/1991 Wang .................. F16D 65/0006
188/264 G
(Continued)

*Primary Examiner* — Christopher P Schwartz
(74) *Attorney, Agent, or Firm* — Ladas & Parry, LLP (57) ABSTRACT

The invention relates to a brake assembly (100; 200; 300), comprising:
a caliper comprising a brake cylinder (5) formed in one piece with an outer clamping portion (6), the brake cylinder (5) defining an axial direction (9) and the outer clamping portion (6) forming a pair of outer clamping fingers (6a, 6b) and a recess (7) formed in between the outer clamping fingers (6a, 6b);
a brake piston (12) received in the brake cylinder (5) and configured to move axially with respect to the brake cylinder (5); and
an inner brake pad assembly (4a) and an outer brake pad assembly (4b), the inner brake pad assembly (4a) and the outer brake pad assembly (4b) disposed axially in between the brake piston (12) and the outer clamping portion (6),
wherein the pair of outer clamping fingers (6a, 6b) of the outer clamping portion (6) define a pair of outer clamping surfaces (18a, 18b) facing the brake piston (12), the outer clamping portion (6) configured to exert a clamping force on the outer brake pad assembly (4b) by means of the outer clamping surfaces (18a, 18b).
A clamping portion (16) for exerting a clamping force on the inner brake pad assembly (4a) may protrude out of the brake cylinder (5) and extend fully or at least partially laterally outward from the brake piston (12).
Alternatively, a maximum lateral extension of the brake piston (12) may be equal to or larger than a maximum lateral extension of the pair of outer clamping surfaces (18a, 18b), wherein the inner clamping portion (16) extends fully or at least partially laterally inward from the brake piston (12).

15 Claims, 6 Drawing Sheets

(51) Int. Cl.
    *F16D 55/226*     (2006.01)
    *F16D 65/00*     (2006.01)
    *B60T 1/06*     (2006.01)
    *F16D 121/04*     (2012.01)
    *F16D 55/00*     (2006.01)

(52) U.S. Cl.
    CPC .... *F16D 65/0068* (2013.01); *F16D 2055/002* (2013.01); *F16D 2055/0008* (2013.01); *F16D 2055/0016* (2013.01); *F16D 2121/04* (2013.01); *F16D 2250/0076* (2013.01)

(58) Field of Classification Search
    USPC ........ 188/72.1–72.5, 73.1, 73.2, 264 G, 369, 188/370
    See application file for complete search history.

(56) References Cited

U.S. PATENT DOCUMENTS

| | | | | |
|---|---|---|---|---|
| 5,036,932 | A * | 8/1991 | Schonenberger | F16D 55/226 188/71.1 |
| 5,080,203 | A * | 1/1992 | Heibel | F16D 55/2262 188/73.31 |
| 5,279,394 | A * | 1/1994 | Wollenweber | B60T 8/52 188/1.11 E |
| 9,897,152 | B2 | 2/2018 | Sabeti et al. | |
| 10,174,840 | B2 * | 1/2019 | Ruiz | F16J 1/008 |
| 2006/0049008 | A1 * | 3/2006 | Kinoshita | F16D 55/227 188/73.39 |

* cited by examiner

BRAKE ASSEMBLY

CROSS-REFERENCE TO RELATED APPLICATION

This application claims priority to German Patent Application No. 102018219752.0, filed on Nov. 19, 2018, the entire content of which is incorporated herein by reference.

The present disclosure relates primarily to a brake assembly, in particular to a brake assembly for an automotive vehicle.

Known brake assemblies for automotive vehicles typically include a pair of brake pad assemblies that may be pressed or clamped against a brake disc from opposite sides. Clamping forces for pressing or clamping the brake pad assemblies against the brake disc are usually provided by a calliper and by a brake piston that is movably received in a brake cylinder that forms part of the calliper.

For example, US 2006/049008 A1 relates to a floating caliper disc brake for vehicles comprising a caliper, a support member supporting the caliper and a rotor such as a brake disc, wherein the caliper is displaceable in an axial direction of the rotor. Pressed-side shim plates are respectively lined on reverse surfaces of back plates of pads supported by the support member, while supporting-side shim plates are lined on an inner side surface of a claw portion and on a distal end face of a piston. The pressed-side shim plates and the pressing-side shim plates are respectively retained by mating members to be lined on by means of resilient retainers, and one surface of each of the mutually opposing pressed-side shim plates and one surface of each of the pressing-side shim plates are slidably abutted against each other.

However, during braking brake assemblies such as the one described in US 2006/049008 A1 tend to excite vibrations of one or more brake assembly components. These vibrations typically put additional strain on the vibrating components, resulting in increased material fatigue, a shortened service life of the brake assembly and a heightened risk of material breakage. A further undesired side effect is the brake squeal caused by the vibrations.

Thus, there is demand for a brake assembly causing a preferably low level of vibrations of brake assembly components during braking.

A brake assembly achieving this objective is defined in claim 1. Special embodiments are described in the dependent claims.

The presently proposed brake assembly comprises:
- a caliper comprising a brake cylinder, typically a hydraulic brake cylinder, formed in one piece with an outer clamping portion, the brake cylinder defining an axial direction or z-direction and the outer clamping portion forming a pair of outer clamping fingers and a recess formed in between the outer clamping fingers;
- a brake piston received in the brake cylinder and configured to move axially with respect to the brake cylinder; and
- an inner brake pad assembly and an outer brake pad assembly, the inner brake pad assembly and the outer brake pad assembly disposed axially, i.e. along the z-direction, in between the brake piston and the outer clamping portion.

The pair of outer clamping fingers of the outer clamping portion defines a pair of outer clamping surfaces facing the brake piston, the outer clamping portion configured to exert a clamping force on the outer brake pad assembly via or by means of the outer clamping surfaces. The outer clamping surfaces typically extend in a lateral direction or in a lateral plane arranged or aligned perpendicular to the axial direction or z-direction. In other words, based on a Cartesian coordinate system the lateral direction or lateral plane is arranged or aligned in parallel to an x-y-plane perpendicular to the axial direction or z-direction. The clamping force which may be exerted on the outer brake pad assembly via the outer clamping surfaces is typically directed along the axial direction pointing from the outer clamping portion toward the inner clamping portion.

The brake piston of the presently proposed brake assembly further comprises an inner clamping portion, wherein the inner clamping portion defines a pair of inner clamping surfaces and a recess formed in between the inner clamping surfaces. The inner clamping portion is typically disposed at an end of the brake piston facing the outer clamping portion. The inner clamping surfaces face the outer clamping portion and are disposed axially opposite the outer clamping surfaces. The inner clamping surfaces usually extend in a lateral plane perpendicular to the axial direction. The brake piston is configured to exert a clamping force on the inner brake pad assembly via or by means of the inner clamping surfaces. The clamping force which may be exerted on the inner brake pad assembly via the inner clamping surfaces is typically directed along the axial direction pointing from the inner clamping portion toward the outer clamping portion.

The inner clamping portion including the inner clamping surfaces may protrude out of the brake cylinder and may extend fully or at least partially laterally outward from the brake piston. For example, the inner clamping portion may extend fully or at least partially laterally outward from an axially extending wall of the brake piston, wherein the axially extending wall of the brake piston is received or at least partially received in the brake cylinder.

Alternatively, the brake piston may be configured such that a maximum lateral extension of the brake piston is equal to or larger than a maximum lateral extension of the pair of outer clamping surfaces. The inner clamping portion including the inner clamping surfaces may then extend fully or at least partially laterally inward from the brake piston. For example, the inner clamping portion may extend fully or at least partially laterally inward from the axially extending wall of the brake piston, wherein the axially extending wall of the brake piston is received or at least partially received in the brake cylinder.

Preferably, the inner clamping portion is configured such that the structural robustness, rigidity and the geometry of the inner clamping portion including the inner clamping surfaces, in particular a thickness of the inner clamping portion along the axial direction, is such that the clamping force or the clamping pressure exerted on the inner brake pad assembly via the inner clamping surfaces is evenly or nearly evenly distributed over the inner clamping surfaces.

As the inner clamping portion extends at fully or at least partially laterally outward or inward from the brake piston such as from the axially extending wall of the brake piston, and as the pair of inner clamping surfaces facing the outer clamping portion are disposed axially opposite the pair of outer clamping surfaces facing the inner clamping portion, the clamping force exerted on the inner brake pad assembly via or by means of the inner clamping surfaces and the clamping force exerted on the outer brake pad assembly via or by means of the outer clamping surfaces may feature lateral clamping pressure distributions which are, respectively, equal or essentially equal in magnitude and opposite in direction. That is, for a lateral distribution $p_{in}(x, y)$ of a clamping pressure exerted on the inner brake pad assembly via the inner clamping surfaces and pointing toward the outer clamping portion and for a lateral distribution $p_{out}(x, y)$ of a clamping pressure exerted on the outer brake pad assembly via the outer clamping surfaces and pointing toward the inner clamping portion, the relation $|p_{in}(x, y)| \approx |p_{out}(x, y)|$ may hold for all or for essentially all lateral coordinates x and y. Or in other words, the pressure distribution that may be applied to the inner brake pad assembly via the pair of inner clamping surfaces and the pressure distribution that may be applied to the outer brake pad assembly via the pair of outer clamping surfaces may feature a particularly high degree of symmetry and homogeneity with respect to each other.

In this way, a highly harmonic balance may be achieved between the force or pressure acting on the inner brake pad assembly and the force or pressure acting on the outer brake pad assembly. It has been shown that such a configuration greatly diminishes the excitation of vibrations of the brake assembly during braking. Consequently, a strain put on brake assembly components such as the calliper, the brake pad assemblies and the brake piston can be significantly reduced, the service life of the brake assembly can be significantly prolonged and an undesired brake squeal caused by vibrating components can be greatly suppressed.

In particular, the design of the presently proposed brake assembly including the brake piston defining the inner clamping surfaces and the outer clamping portion defining the outer clamping surfaces ensures that at the beginning of clamping pressure generation the same or essentially the same initial conditions may be simultaneously applied to the inner brake pad assembly and to the outer brake pad assembly. Additionally, axial clearances between the inner and the outer brake pad assembly and a rotatable brake disc axially disposed in between the inner and the outer brake pad assembly and connected to a vehicle wheel may be strongly reduced or avoided entirely. Consequently, usually any vibration induced during or after braking causes the components of the brake assembly which are brought into contact with one another by the applied clamping force—including the brake disc, the inner and the outer brake pad assembly as well as the inner and the outer clamping portion—to oscillate as a single compact unit. Thus, relative vibrations between the various brake assembly components are strongly reduced or avoided entirely, and the amplitude of vibrations excited in the brake assembly may be significantly diminished. Specifically, the total number of Eigenmodes of the brake assembly and in particular of the brake disc may be greatly reduced, thereby strongly suppressing or avoiding mode coupling between different vibrational modes of the brake assembly which are known to lead to the generation of unstable modes and of undesired squeal noises.

The pair of inner clamping surfaces may have the same geometrical shape or essentially the same geometrical shape as the pair of outer clamping surfaces. In this way, the clamping forces or the clamping pressures exerted on the inner brake pad assembly and on the outer brake pad assembly via the inner clamping surfaces and via the outer clamping surfaces may feature a particularly high degree of similarity or symmetry with respect to one another, thereby minimizing the excitation of vibrations of the brake assembly.

For example, like the outer clamping portion the inner clamping portion may form a pair of inner clamping fingers, wherein the pair of inner clamping fingers defines the pair of inner clamping surfaces facing the outer clamping portion. The inner clamping fingers may then be disposed axially opposite the outer clamping fingers. Similarly, the recess formed in between the inner clamping fingers may then be disposed axially opposite the recess formed in between the outer clamping fingers.

The inner clamping portion is typically configured such that the recess formed in between the inner clamping surfaces is disposed in between the inner clamping surfaces along a first lateral direction such as a horizontal direction perpendicular to the axial direction. The inner clamping portion may then further be configured such that the recess formed in between the inner clamping surfaces is open along a second lateral direction such as a vertical direction, wherein the second lateral direction is perpendicular to the first lateral direction and to the axial direction.

The outer clamping portion is preferably configured in a same or in a similar manner. Specifically, the outer clamping portion is typically configured such that the recess formed in between the outer clamping fingers and in between the outer clamping surfaces is disposed in between the inner clamping surfaces along the first lateral direction such as the horizontal direction perpendicular to the axial direction. The outer clamping portion may then further be configured such that the recess formed in between the outer clamping surfaces is open along the above mentioned second lateral direction such as the vertical direction. Typically, the recess formed in between the inner clamping surfaces and the recess formed in between the outer clamping surfaces are open toward the same direction along the second lateral direction or vertical direction.

The symmetric shape and arrangement of the inner clamping portion including the pair of inner clamping surfaces and the outer clamping portion including the pair of outer clamping surfaces with respect to one another can be expressed by the degree of similarity between an area of the pair of outer clamping surfaces and an area of an axial projection of the pair of outer clamping surfaces onto the pair of inner clamping surfaces, wherein the term axial projection refers to a projection along the axial direction or z-direction, and/or by the degree of similarity between an area of the pair of inner clamping surfaces and an area of an axial projection of the pair of inner clamping surfaces onto the pair of outer clamping surfaces.

For example, the pair of inner clamping surfaces and the pair of outer clamping surfaces may be configured such that the area of the axial projection of the pair of outer clamping surfaces onto the pair of inner clamping surfaces amounts to at least 70 percent, preferably to at least 80 percent, more preferably to at least 90 percent of the area of the pair of outer clamping surfaces. Additionally or alternatively, the pair of inner clamping surfaces and the pair of outer clamping surfaces may be configured such that the area of the axial projection of the pair of inner clamping surfaces onto the pair of outer clamping surfaces amounts to at least 70 percent, preferably to at least 80 percent, more preferably to at least 90 percent of the area of the pair of inner clamping surfaces.

The brake piston and the inner clamping portion may comprise the same material or may be made of the same material. For example, the brake piston and the inner clamping portion may be made of or may comprise a metal such as steel, cast iron or aluminium. However, it is likewise conceivable that the brake piston and the inner clamping portion may be made of or may comprise a non-metallic material such as plastic, in particular a thermosetting plastic or a thermoplast. The inner clamping portion including the pair of inner clamping surfaces may be formed in one piece or may comprise two separate pieces. In particular, the brake piston and the inner clamping portion may be formed in one piece. Alternatively, the inner clamping portion may be joined to the brake piston via a positive substance joint, such as via a weld or via a braze joint.

Another possibility of diminishing or preventing vibrations in particular of the lateral ends of the brake pad assemblies consists in configuring the brake pad assemblies and the inner and/or outer clamping surfaces in such a way that the inner and/or outer clamping surfaces may press or bear against the inner and/or against the outer brake pad assembly at or near the lateral ends of the brake pad assemblies.

For example, the pair of inner clamping surfaces may include a first inner clamping surface and a second inner clamping surface. And the inner brake pad assembly may include a first lateral end portion, a second lateral end portion and a central portion laterally disposed in between the first lateral end portion and the second lateral end portion. For example, the central portion may be disposed in between the first lateral end portion and the second lateral end portion along the above-mentioned first lateral direction or horizontal direction. The inner clamping portion including the first inner clamping surface and the second inner clamping surface and the inner brake pad assembly may then be configured such that the first inner clamping surface may exert a clamping force or clamping pressure on the first lateral end portion of the inner brake pad assembly, and that the second inner clamping surface may exert a clamping force or clamping pressure on the second lateral end portion of the inner brake pad assembly.

For instance the first lateral end portion and the second lateral end portion of the inner brake pad assembly may each extend over at most one third, preferably each over at most one fourth, more preferably each over at most one fifth of a lateral extension of the inner brake pad assembly, for example along the above-mentioned first lateral direction or horizontal direction. This is in contrast to brake assemblies known from the prior art where the brake piston is typically configured to press against the central portion of the inner brake pad assembly.

The inner brake pad assembly may comprise a back plate facing the inner clamping portion and a lining attached to the back plate of the inner brake pad assembly and facing the outer clamping portion. The inner brake pad assembly and the inner clamping assembly including the pair of inner clamping surfaces may then be configured such that the inner clamping surfaces may directly contact the back plate of the inner brake pad assembly in order to exert a clamping force on the inner brake pad assembly. Similarly, the outer brake pad assembly may comprise a back plate facing the outer clamping portion and a lining attached to the back plate of the outer brake pad assembly and facing the outer clamping portion. The outer brake pad assembly and the outer clamping assembly including the pair of outer clamping surfaces may then be configured such that the outer clamping surfaces may directly contact the back plate of the outer brake pad assembly in order to exert a clamping force on the outer brake pad assembly.

The brake assembly may further include a brake disk axially disposed in between the inner brake pad assembly and the outer brake pad assembly, such that the brake piston is configured to exert a clamping force on the brake disc via the pair of inner clamping surfaces and the inner brake pad assembly, and such that the outer clamping portion is configured to exert a clamping force on the brake disc via the pair of outer clamping surfaces and the outer brake pad assembly.

The brake assembly may further include a caliper bracket rigidly connected to a vehicle frame or configured to be rigidly connected to a vehicle frame. The inner brake pad assembly and the outer brake pad assembly may be mounted on the caliper bracket and laterally confined by the caliper bracket. And the caliper including the brake cylinder and the outer clamping portion may be configured to move axially with respect to the caliper bracket (floating caliper).

Special embodiments of the presently proposed brake assembly are described in the following detailed description and are depicted in the Figures, in which:

FIG. 1b schematically depicts a plan view of a detail of the brake assembly of FIG. 1a;

FIG. 1c schematically depicts a plan view of a further detail of the brake assembly of FIG. 1a;

FIG. 2b schematically depicts a plan view of a detail of the brake assembly of FIG. 2a.

Figure 1A:
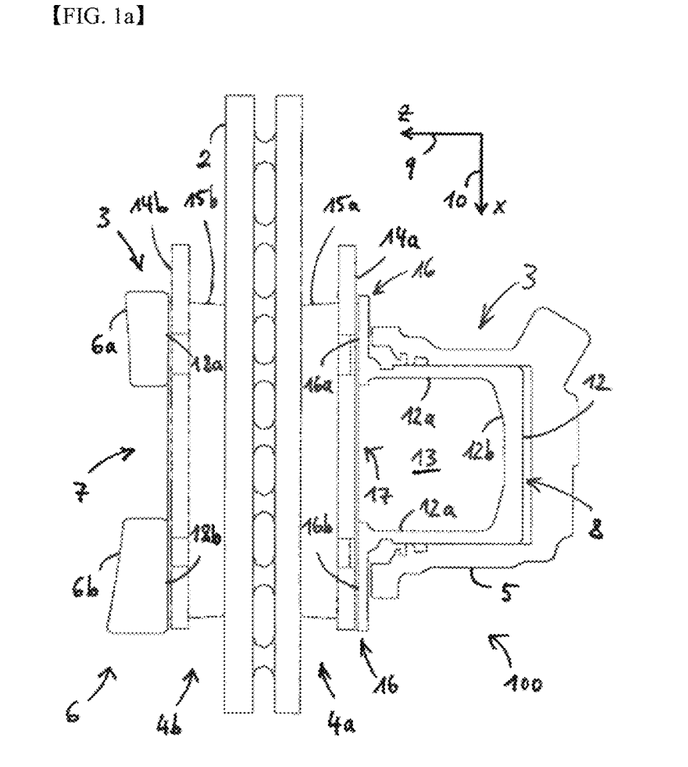
FIG. 1a schematically depicts a sectional view of a brake assembly according to a first embodiment.

FIG. 1a schematically depicts a sectional view of a brake assembly 100 according to a first embodiment. The brake assembly 100 comprises a rotatable brake disc 2, a caliper 3, an inner brake pad assembly 4a, an outer brake pad assembly 4b. The brake disc 2 may be coupled to a vehicle wheel (not shown) such that the vehicle wheel may be decelerated by frictionally engaging the brake pad assemblies 4a, 4b with brake disc 2. The caliper 3 comprises a brake cylinder 5, typically a hydraulic brake cylinder, and an outer clamping portion 6. The brake cylinder 5 and the outer clamping portion 6 are formed in one piece.

The brake cylinder 5 forms a cylinder cavity 8 having a cylindrical shape. However, it is understood that in alternative embodiments the cylinder cavity 8 may have a non-cylindrical shape. The cylinder cavity 8 defines an axial direction or z-axis 9 typically aligned in parallel to an axis of rotation of the brake disc 2 and the vehicle wheel. An x-axis 10, a y-axis 11 (see FIGS. 1b, 1c and 2b) and the z-axis 9 define a right handed Cartesian coordinate system. In the following, planes aligned in parallel to the x-y-plane may be referred to as lateral planes, and directions extending in parallel to the x-y-plane may be referred to as lateral directions. The outer clamping portion 6 comprises or forms a pair of outer clamping fingers 6a, 6b and a recess 7 formed laterally in between the outer clamping fingers 6a, 6b.

The brake assembly 100 further comprises a brake piston 12 movably received in the brake cylinder 5, more specifically in the cylinder cavity 8. The brake piston 12 may move relative to the brake cylinder 5 and relative to the brake disc 2 along the axial direction 9. The brake piston 12 is hollow or at least partially hollow. The brake piston 12 has a piston body portion comprising an axially extending wall portion 12a which may have a cylindrical shape, and a laterally extending plate portion 12b. The wall portion 12a and the plate portion 12b may be formed in one piece. In the embodiment depicted in FIG. 1a the plate portion 12b is disposed at an axial end of the piston 12 facing away from the clamping portion 6. The piston body portion including the wall portion 12a and the plate portion 12b enclose a space 13. The space 13 is open at an axial end of the brake piston 12 facing the clamping portion 6. The brake piston 12 may be actuated by selectively filling the cylinder cavity 8 with a hydraulic fluid such as oil. To that end, the cylinder cavity 8 may be in fluid communication with a pressure source such as a hydraulic pump or a further hydraulic cylinder (not shown).

The brake disc 2 and the brake pad assemblies 4a, 4b are disposed axially in between the brake piston 12 and the outer clamping portion 6 including the clamping fingers 6a, 6b. The inner brake pad assembly 4a comprises an inner back plate 14a facing the brake piston 12 and the brake cylinder 5, and an inner lining 15a attached to the inner back plate 14a and facing the brake disc 2 and the outer clamping portion 6. The outer brake pad assembly 4b comprises an outer back plate 14b facing the outer clamping portion 6, and an outer lining 1ba attached to the outer back plate 14b and facing the brake disc 2, the brake piston 12 and the brake cylinder 5. Optionally, the brake pad assemblies 4a, 4b may further comprise shim plates disposed axially in between the inner brake pad assembly 4a and the brake piston 12, and in between the outer brake pad assembly 4b and the outer clamping portion 6.

Typically, the brake pad assemblies 4a, 4b are slidably mounted on a caliper bracket which is rigidly connected to a vehicle frame and stationary with respect to the vehicle frame (not shown). Usually, the brake pad assemblies 4a, 4b are mounted on the caliper bracket in such a way that they may slide relative to the caliper bracket along the axial direction 9 to allow the brake pad assemblies 4a, 4b to be pressed against the brake disc 2 and to frictionally engage the with the brake disc 2 by means of the linings 15a, 15b for braking the brake disc 2. Normally, the caliper bracket restricts a lateral movement of the brake pad assemblies 4a, 4b relative to the caliper bracket so that the caliper bracket may exert a brake torque on the rotating brake disc 2 via the brake pad assemblies 4a, 4b when the brake pad assemblies 4a, 4b are pressed against the brake disc 2.

The caliper 3 including the brake cylinder 5 and the outer clamping portion 6 is configured to move or slide relative to the brake disc 2 along the axial direction 9. For example, the caliper 3 including the brake cylinder 5 and the outer clamping portion 6 may be slidably mounted on the previously described caliper bracket so that the caliper 3 including the brake cylinder 5 and the outer clamping portion 6 may move or slide relative to the caliper bracket and to the vehicle frame along the axial direction 9.

The brake assembly 100 shown in FIG. 1a differs from known brake assemblies in that the brake piston 12 comprises an inner clamping portion 16 which is disposed at an axial end of the brake piston 12 facing the outer clamping portion 6. In the embodiment depicted in FIG. 1a the inner clamping portion 16 and the piston body portion, which comprises the wall portion 12a and the plate portion 12b and which is movably received in the cylinder cavity 8, are made of the same material. For example, the inner clamping portion 16 and the piston body portion may be made of or may comprise a metal such as steel. Here, the inner clamping portion 16 and the piston body portion including the wall portion 12a and the plate portion 12b are made in one piece. However, in alternative embodiments the inner clamping portion 16 and the piston body portion may be configured as separate pieces connected to one another. For example, when the inner clamping portion 16 and the piston body portion are configured as separate pieces, the inner clamping portion 16 may be connected to the wall portion 12a via a positive substance joint, such as via a weld or via a braze joint.

The inner clamping portion 16 comprises or defines a pair of inner clamping surfaces 16a, 16b and a recess 17 formed laterally in between the inner clamping surfaces 16a, 16b. The inner clamping surfaces 16a, 16b face the inner brake pad assembly 4a and the outer clamping portion 6 and are aligned perpendicular to the axial direction 9. Specifically, the inner clamping surfaces 16a, 16b are formed in or define a common plane aligned perpendicular to the axial direction 9. In the embodiment depicted in FIG. 1a the inner clamping portion 16 including the inner clamping surfaces 16a, 16b protrudes out of the brake cylinder, in particular out of the cylinder cavity 8, and extends laterally outward from the wall portion 12a which is movably received in the cylinder cavity 8. For example, in the embodiment depicted in FIG. 1a each of the inner clamping surfaces 16a, 16b may extend laterally outward from the wall portion 12a by at least one third or by at least one fourth of a maximum lateral extension of the wall portion 12a.

Figure 1B:
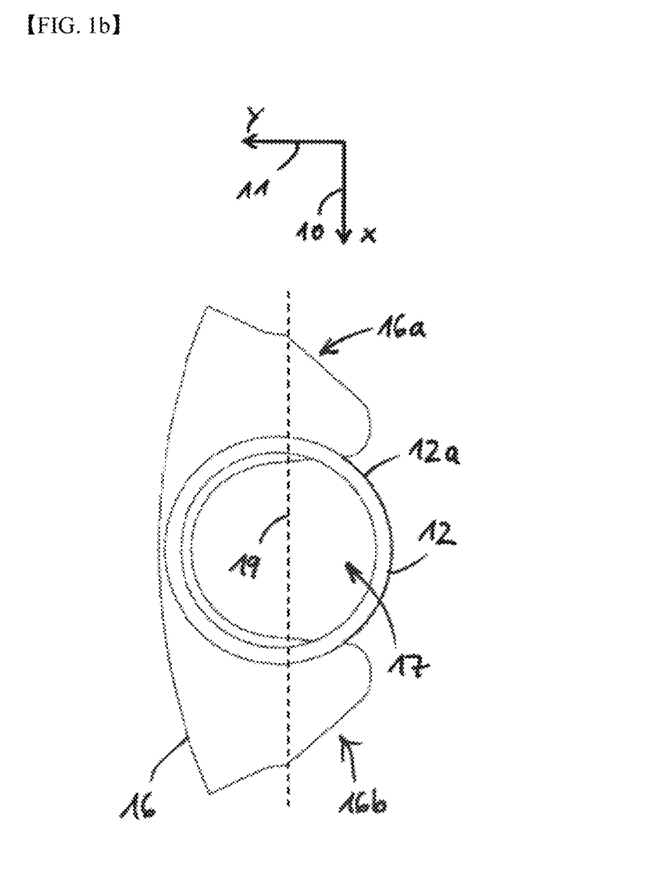

FIG. 1b shows a plan view of the inner clamping portion 16, wherein the viewing direction is along the positive z-direction 9, i.e. from right to left in FIG. 1a, and wherein the sectional plane of FIG. 1a is indicated by a dashed line 19. Here and in all of the following the same or similar features depicted in different Figures are designated with the same reference signs. FIG. 1b clearly shows that the inner clamping surfaces 16a, 16b extend laterally outward from the cylindrical wall portion 12a of the brake piston 12. In the embodiment depicted in FIGS. 1a and 1b the inner clamping surfaces 16a, 16b are formed in one piece. However, it is understood that in alternative embodiments the inner clamping surfaces 16a, 16b may be configured as separate pieces.

The recess 17 is formed in between the inner clamping surfaces 16a, 16b along the x-direction or horizontal direction 10. In FIG. 1b the maximum extension of the recess 17 along the x-direction 10 amounts to at least one third of a maximum lateral extension of the inner clamping portion 16 including the inner clamping surfaces 16a, 16b. In alternative embodiments, the maximum extension of the recess 17 along the x-direction 10 may amount to at least one fifth or to at least one fourth of the maximum lateral extension of the inner clamping portion 16 including the inner clamping surfaces 16a, 16b. The recess 17 is open on one side along the y-direction 11. In the embodiment shown in FIG. 1b a maximum extension of the recess 17 along the y-direction 11 amounts to at least 80 percent of a maximum extension of the inner clamping assembly 16 along the y-direction 11. In alternative embodiments, a maximum extension of the recess 17 along the y-direction 11 may amount to at least 60 percent or to at least 70 percent of a maximum extension of the inner clamping assembly 16 along the y-direction 11.

Similarly, the outer clamping fingers 6a, 6b of the outer clamping portion 6 comprise or define a pair of outer clamping surfaces 18a, 18b. The recess 7 is formed laterally in between the outer clamping surfaces 6a, 6b. The outer clamping surfaces 18a, 18b face the outer brake pad assembly 4b and the brake piston 12 including the inner clamping portion 16. The outer clamping surfaces 18a, 18b are aligned perpendicular to the axial direction 9. Specifically, the outer clamping surfaces 18a, 18b are formed in or define a common plane aligned perpendicular to the axial direction 9.

As the brake piston 12 including the inner clamping portion 16 is pushed against the inner brake pad assembly 4a, in the embodiment depicted in FIG. 1a by filling the cylinder cavity 8 with a hydraulic fluid, the inner clamping surfaces 16a, 16b contact the inner brake pad assembly 4a, in particular the inner back plate 14a or a shim plate disposed in between the inner back plate 14a and the inner clamping surfaces 16a, 16b, and are pressed against the inner brake pad assembly 4a. The brake piston 12 then exerts a clamping force or a clamping pressure on the inner brake pad assembly 4a via the inner clamping surfaces 16a, 16b, thereby pressing the inner brake pad assembly 4a against the brake disc 2. By contrast, where the recess 17 is formed in between the inner clamping surfaces 16a, 16b, no clamping force or clamping pressure is exerted on the inner brake pad assembly 4a.

And as the brake piston 12 is pushed against the inner brake pad assembly 4a in the positive z direction (i.e. toward the left in FIG. 1a), the brake piston 12 exerts an equal and opposite force (i.e. toward the right in FIG. 1a) on the caliper 3 including the brake cylinder 5 and the outer clamping portion 6, thereby pushing the outer clamping portion 6 against the outer brake pad assembly 4b. The outer clamping surfaces 18a, 18b then contact the outer brake pad assembly 4b, in particular the outer back plate 14b or a shim plate disposed in between the outer back plate 14b and the outer clamping surfaces 18a, 18b, and press against the outer brake pad assembly 4b. The outer clamping portion 6 then exerts a clamping force or a clamping pressure on the outer brake pad assembly 4b via the outer clamping surfaces 18a, 18b, thereby pressing the outer brake pad assembly 4b against the brake disc 2. By contrast, where the recess 7 is formed in between the outer clamping surfaces 18a, 18b, no clamping force or clamping pressure is exerted on the outer brake pad assembly 4b.

The brake assembly 100 depicted in FIG. 1a is particularly advantageous in that the inner clamping portion 16 including the pair of inner clamping surfaces 16a, 16b and the outer clamping portion 6 including the pair of outer clamping surfaces 18a, 18b are configured or designed to apply the same or similar pressure distributions on the inner brake pad assembly 4a and on the outer brake pad assembly 4b, thereby creating an exact or almost exact force or pressure balance between the forces or pressures exerted on the inner brake pad assembly 4a and on the outer brake pad assembly 4b. In other words, the presently proposed layout allows same or similar initial force or pressure conditions to be applied on the inner brake pad assembly 4a and on the outer brake pad assembly 4b during a braking maneuver.

Figure 1C:
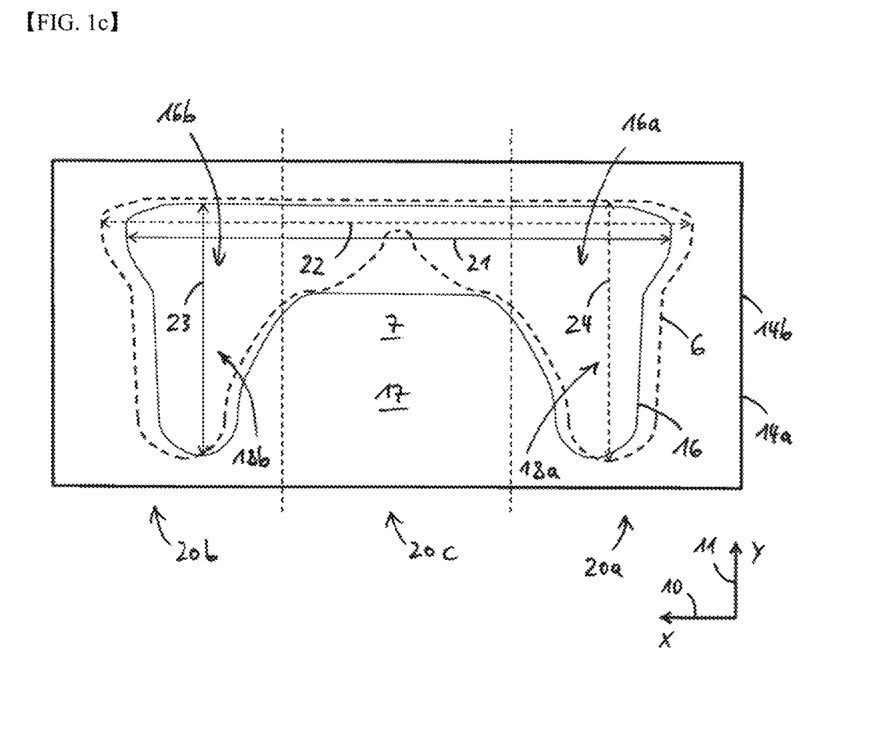

To that end, the pair of inner clamping surfaces 16a, 16b and the pair of outer clamping surfaces 18a, 18b are designed such that they have the same or similar geometrical shapes and are disposed exactly or nearly exactly opposite one another along the axial direction 9. Also, the pair of inner clamping surfaces 16a, 16b and the pair of outer clamping surfaces 18a, 18b have the same sizes and dimensions or nearly the same sizes and dimensions. This arrangement is illustrated in FIG. 1c which schematically shows axial projections of the inner clamping portion 16 (continuous line) including the pair of inner clamping surfaces 16a, 16b and the recess 17 formed in between the inner clamping surfaces 16a, 16b, of the inner back plate 14a and of the outer back plate 14b, and of the outer clamping portion 6 (dashed line) including the pair of outer clamping surfaces 18a, 18b and the recess 7 formed in between the outer clamping surfaces 18a, 18b onto a lateral plane perpendicular to the axial direction 9. The axial projections of the inner back plate 14a and of the outer back plate 14b exactly overlap one another. In FIG. 1c the viewing direction points in the positive z-direction 9, i.e. from right to left in FIG. 1a.

FIG. 1c illustrates that both the inner clamping surfaces 16a, 16b and the outer clamping surfaces 18a, 18b have the shape of a pair of fingers extending in the y-direction 11, respectively. The axial projection of the inner clamping surfaces 16a, 16b and the axial projection of the outer clamping surfaces 18a, 18b overlap with one another nearly exactly. More specifically, the axial projection of the outer clamping surface 18a overlaps with the axial projection of the inner clamping surface 16a nearly exactly, and the axial projection of the outer clamping surface 18b overlaps with the axial projection of the inner clamping surface 16b nearly exactly. Similarly, the axial projection of the recess 17 formed in between the inner clamping surfaces 16a, 16b and the axial projection of the recess 17 formed in between the outer clamping surfaces 18a, 18b overlap with one another nearly exactly.

For example, a maximum lateral extension of the pair of inner clamping surfaces 16a, 16b and a maximum lateral extension of the pair of outer clamping surfaces 18a, 18b may differ from one another by at most 20 percent, preferably by at most 10 percent. More specifically, a maximum extension 21 of the pair of inner clamping surfaces 16a, 16b along the x-axis 10 and a maximum extension 22 of the pair of outer clamping surfaces 18a, 18b along the x-axis 10 may differ from one another by at most 20 percent, preferably by at most 10 percent; a maximum extension 23 of the pair of inner clamping surfaces 16a, 16b along the y-axis 11 and a maximum extension 24 of the pair of outer clamping surfaces 18a, 18b along the y-axis 11 may differ from one another by at most 20 percent, preferably by at most 10 percent. And an area of the pair of inner clamping surfaces 16a, 16b and an area of the pair of outer clamping surfaces 18a, 18b may differ from one another by at most 20 percent, preferably by at most 10 percent.

FIG. 1c further illustrates that the pair of inner clamping surfaces 16a, 16b and the pair of outer clamping surfaces 18a, 18b are configured such that an area of an axial projection of the pair of outer clamping surfaces 18a, 18b onto the pair of inner clamping surfaces 16a, 16b amounts to at least 70 percent, preferably to at least 80 percent, more preferably to at least 90 percent of the area of the pair of outer clamping surfaces 18a, 18b. Analogously, an area of an axial projection of the pair of inner clamping surfaces 16a, 16b onto the pair of outer clamping surfaces 18a, 18b amounts to at least 70 percent, preferably to at least 80 percent, more preferably to at least 90 percent of the area of the pair of inner clamping surfaces 16a, 16b.

In FIG. 1c both the inner back plate 14a of the inner brake pad assembly 4a and the outer back plate 14b of the outer brake pad assembly 4b are divided in a first lateral end portion 20a, a second lateral end portion 20b and a central portion 20c disposed in between the first lateral end portion 20a and the second lateral end portion 20b along the x-direction 10. Each of the portions 20a-c extends over one third of the extension of the identical back plates 14a, 14b along the x-direction 10. FIG. 1c shows that in order to suppress axial vibrational modes of the inner brake pad assembly 4a, the inner clamping surfaces 16a, 16b and the inner back plate 14a are arranged relative to one another in such a way that as the inner clamping portion 16 presses or bears against the inner back plate 14a, the first inner clamping surface 16a presses or bears against the first lateral end portion 20a of the inner back plate 14a, and the second inner clamping surface 16b presses or bears against the second lateral end portion 20b of the inner back plate 14a. Similarly, the outer clamping surfaces 18a, 18b and the outer back plate 14b are arranged relative to one another in such a way that as the outer clamping portion 6 presses or bears against the outer back plate 14b, the first outer clamping surface 18a presses or bears against the first lateral end portion 20a of the outer back plate 14b, and the second outer clamping surface 18b presses or bears against the second lateral end portion 20b of the outer back plate 14b.

Figure 2A:
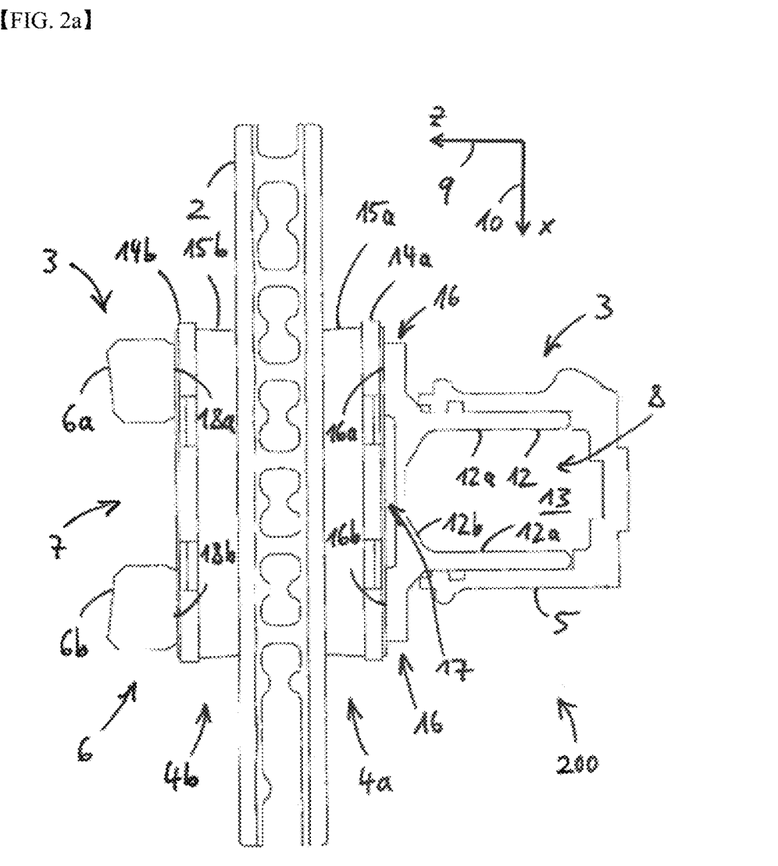
FIG. 2a schematically depicts a sectional view of a brake assembly according to a second embodiment.
Figure 2B:
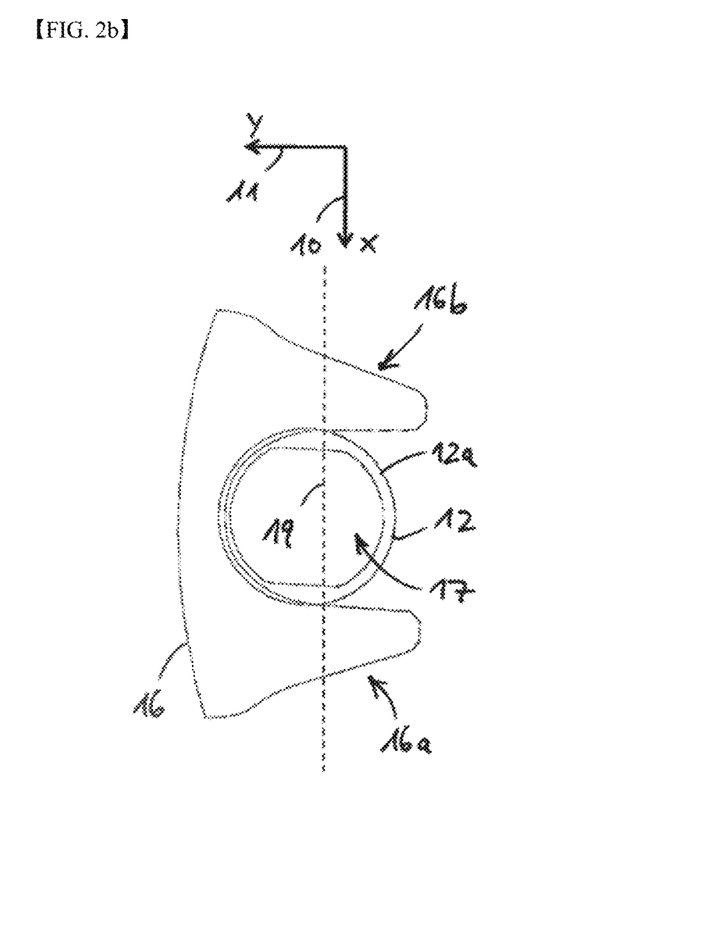

FIG. 2a schematically depicts a sectional view of a brake assembly 200 according to a second embodiment. As before, the same or similar features are designated with the same reference signs. FIG. 2b shows a plan view of the inner clamping portion 16 of the brake assembly 200 depicted in FIG. 2a, wherein the viewing direction in FIG. 2b is along the positive z-direction 9, i.e. from right to left in FIG. 2a, and wherein the sectional plane of FIG. 2a is indicated by a dashed line 19 in FIG. 2b.

The brake assembly 200 of FIG. 2a differs from the brake assembly 100 of FIG. 1a in that in the brake assembly 200 of FIG. 2a the plate portion 12b of the brake piston 12 is disposed at or near the axial end of the brake piston 12 facing the outer brake portion 6 so that the recess 17 formed in between the inner clamping surfaces 16a, 16b has a reduced axial depth as compared to the embodiment depicted in FIG. 1a. The layout of the piston 12 shown in FIG. 2a may provide the inner clamping portion 16 with further improved mechanical stability. In the brake assembly 200 shown in FIGS. 2a, 2b, the relative sizes, shapes and arrangement of the inner clamping portion 16 including the inner clamping surfaces 16a, 16b and of the outer clamping portion 6 including the outer clamping surfaces 18a, 18b may correspond or essentially correspond with those depicted in FIG. 1c.

Figure 3:
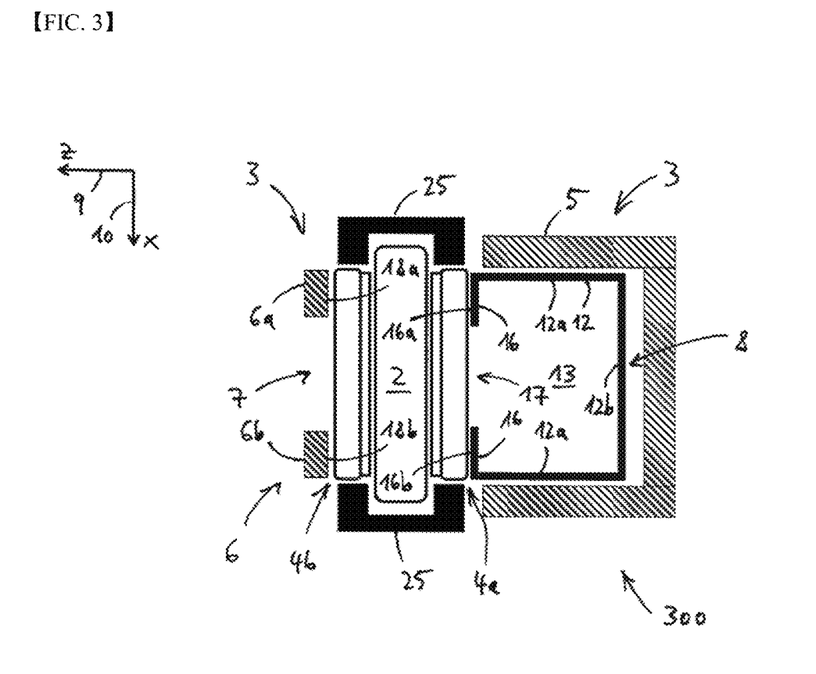
FIG. 3 schematically depicts a sectional view of a brake assembly according to a third embodiment.

FIG. 3 shows a section view of a brake assembly 300 according to a third embodiment. Again, the same or similar features are designated with the same reference signs. The brake assembly 300 of FIG. 3 differs from the brake assemblies 100, 200 of FIGS. 1a, 2a in that in the brake assembly 300 a maximum lateral extension of the brake piston 12, more specifically of the axially extending wall portion 12a that is movably received in the cylinder cavity 8, is equal to or larger than the maximum lateral extension 22 of the pair of outer clamping surfaces 18a, 18b. Additionally, the brake assembly 300 of FIG. 3 differs from the brake assemblies 100, 200 of FIGS. 1a, 2a in that the inner clamping portion 16 including the inner clamping surfaces 16a, 16b extends fully or at least partially laterally inward from the brake piston 12, more specifically from the wall portion 12a. For example, the maximum lateral extension of each of the inner clamping surfaces 16a, 16b may amount to at least one fifth or to at least one fourth of the maximum lateral extension of the brake piston 12, more specifically of the wall portion 12a movably received in the cylinder cavity 8.

The brake assembly 300 shown in FIG. 3 further comprises a caliper bracket 25 which is rigidly connected to a vehicle frame (not shown) and stationary with respect to the vehicle frame. The inner brake pad assembly 4a and the outer brake pad assembly 4b are slidably mounted on the caliper bracket 25 and may move relative to the caliper bracket 25 along the axial direction 9. The caliper bracket 25 restricts lateral movement of the brake pad assemblies 4a, 4b relative to the caliper bracket 25. Similarly, the caliper 3 including the brake cylinder 5 and the outer clamping portion 6 is slidably mounted on the caliper bracket 25 and may move relative to the caliper bracket 25 along the axial direction 9. Typically, the brake assemblies 100, 200 shown in FIGS. 1a, 2a, too, comprise a caliper bracket like the caliper bracket 25 shown in FIG. 3. In the brake assembly 300 shown in FIG. 3, the relative sizes, shapes and arrangement of the inner clamping portion 16 including the inner clamping surfaces 16a, 16b and of the outer clamping portion 6 including the outer clamping surfaces 18a, 18b correspond with those depicted in FIG. 1c.

The invention claimed is:

1. Brake assembly, comprising:
    a caliper comprising a brake cylinder formed in one piece with an outer clamping portion, the brake cylinder defining an axial direction and the outer clamping portion forming a pair of outer clamping fingers and a recess formed in between the outer clamping fingers;
    a brake piston received in the brake cylinder and configured to move axially with respect to the brake cylinder; and
    an inner brake pad assembly and an outer brake pad assembly, the inner brake pad assembly and the outer brake pad assembly disposed axially in between the brake piston and the outer clamping portion,
    wherein the pair of outer clamping fingers of the outer clamping portion define a pair of outer clamping surfaces facing the brake piston, the outer clamping portion configured to exert a clamping force on the outer brake pad assembly by means of the outer clamping surfaces,
    wherein
    the brake piston further comprises an inner clamping portion, wherein the inner clamping portion defines a pair of inner clamping surfaces and a recess formed in between the inner clamping surfaces, the inner clamping surfaces facing the outer clamping portion and the inner clamping surfaces being disposed axially opposite the outer clamping surfaces, wherein the brake piston is configured to exert a clamping force on the inner brake pad assembly by means of the inner clamping surfaces, and wherein
    a. the inner clamping portion including the inner clamping surfaces protrudes out of the brake cylinder and extends fully or at least partially laterally outward from the brake piston, or
    b. a maximum lateral extension of the brake piston is equal to or larger than a maximum lateral extension of the pair of outer clamping surfaces, wherein the inner clamping portion including the inner clamping surfaces extends fully or at least partially laterally inward from the brake piston.

2. The brake assembly of claim 1, wherein the pair of inner clamping surfaces and the pair of outer clamping surfaces have the same geometrical shape or essentially the same geometrical shape.

3. The brake assembly of claim 1, wherein the inner clamping portion forms a pair of inner clamping fingers, wherein the pair of inner clamping fingers defines the pair of inner clamping surfaces facing the outer clamping portion.

4. The brake assembly of claim 1, wherein the recess formed in between the inner clamping surfaces is disposed in between the inner clamping surfaces along a first lateral direction perpendicular to the axial direction, wherein the recess formed in between the inner clamping surfaces is open along a second lateral direction perpendicular to the first lateral direction and to the axial direction.

5. The brake assembly of claim 1, wherein the pair of inner clamping surfaces and the pair of outer clamping surfaces are configured such that an area of an axial projection of the pair of outer clamping surfaces onto the pair of inner clamping surfaces amounts to at least 70 percent, preferably to at least 80 percent, more preferably to at least 90 percent of an area of the pair of outer clamping surfaces.

6. The brake assembly of claim 1, wherein the brake piston and the inner clamping portion comprise the same material or are made of the same material.

7. The brake assembly of claim 1, wherein the inner clamping portion including the pair of inner clamping surfaces is formed in one piece.

8. The brake assembly of claim 1, wherein the brake piston and the inner clamping portion are formed in one piece.

9. The brake assembly of claim 1, wherein the inner clamping portion is joined to the brake piston via a positive substance joint, in particular via a weld or via a braze joint.

10. The brake assembly of claim 1, wherein the pair of inner clamping surfaces include a first inner clamping surface and a second inner clamping surface and the inner brake pad assembly includes a first lateral end portion, a second lateral end portion and a central portion laterally disposed in between the first lateral end portion and the second lateral end portion, wherein the first and the second inner clamping surface are configured to exert a clamping force on the first lateral end portion and on the second lateral end portion of the inner brake pad assembly, respectively.

11. The brake assembly of claim 1, wherein the first lateral end portion and the second lateral end portion of the inner brake pad assembly each extend over at most one third, preferably each over at most one fourth of a lateral extension of the inner brake pad assembly.

12. The brake assembly of claim 1, wherein the inner brake pad assembly comprises a back plate facing the inner clamping portion and a lining attached to the back plate of the inner brake pad assembly and facing the outer clamping portion, wherein the pair of inner clamping surfaces are configured to directly contact the back plate of the inner brake pad assembly.

13. The brake assembly of claim 1, wherein the outer brake pad assembly comprises a back plate facing the outer clamping portion and a lining attached to the back plate of the outer brake pad assembly and facing the outer clamping portion, wherein the pair of outer clamping surfaces are configured to directly contact the back plate of the outer brake pad assembly.

14. The brake assembly of claim 1, further including a vehicle brake disk axially disposed in between the inner brake pad assembly and the outer brake pad assembly, such that the brake piston is configured to exert a clamping force on the brake disc by means of the pair of inner clamping surfaces and the inner brake pad assembly, and such that the outer clamping portion is configured to exert a clamping force on the brake disc by means of the pair of outer clamping surfaces and the outer brake pad assembly.

15. The brake assembly of claim 1, further including a caliper bracket rigidly connected to a vehicle frame or configured to be rigidly connected to a vehicle frame, wherein the inner brake pad assembly and the outer brake pad assembly are mounted on the caliper bracket and laterally confined by the caliper bracket, and wherein the caliper is configured to move axially with respect to the caliper bracket.

* * * * *